United States Patent
Vanderbauwhede et al.

(10) Patent No.: US 6,917,682 B2
(45) Date of Patent: Jul. 12, 2005

(54) METHOD AND DEVICE FOR ECHO CANCELLING

(75) Inventors: Wim Vanderbauwhede, Ghent (BE); Jean Boxho, Woluwe St. Lambert (BE); Damien Luc François Macq, Wake Forest, NC (US)

(73) Assignee: Alcatel, Paris (FR)

( * ) Notice: Subject to any disclaimer, the term of this patent is extended or adjusted under 35 U.S.C. 154(b) by 514 days.

(21) Appl. No.: 09/729,177

(22) Filed: Dec. 5, 2000

(65) Prior Publication Data

US 2001/0021250 A1 Sep. 13, 2001

(30) Foreign Application Priority Data

Dec. 6, 1999  (EP) .............................. 99403062

(51) Int. Cl.⁷ .............................. H04M 1/58
(52) U.S. Cl. ................. 379/406.01; 379/402; 379/403; 379/404; 379/405
(58) Field of Search .................. 379/402–405, 379/390.04, 391–392, 406.01, 406.08, 398, 413.04; 370/285; 341/155

(56) References Cited

U.S. PATENT DOCUMENTS

| | | | | |
|---|---|---|---|---|
| 4,386,430 A | * | 5/1983 | Treiber | 375/232 |
| 4,670,870 A | * | 6/1987 | Hewinson et al. | 370/285 |
| 4,757,530 A | * | 7/1988 | Arnon | 379/404 |
| 5,287,406 A | | 2/1994 | Kakuishi | |
| 5,333,192 A | * | 7/1994 | McGinn | 379/413.04 |
| 5,734,703 A | * | 3/1998 | Hiyoshi | 379/93.28 |
| 6,281,829 B1 | * | 8/2001 | Amrany et al. | 341/155 |
| 6,804,349 B1 | * | 10/2004 | Prat et al. | 379/402 |

FOREIGN PATENT DOCUMENTS

FR     2 583 599 A1    12/1986
GB     2 154836 A      9/1985

* cited by examiner

Primary Examiner—Sinh Tran
Assistant Examiner—Walter F Briney, III
(74) Attorney, Agent, or Firm—Sughrue Mion, PLLC

(57) ABSTRACT

Echo cancelling in a communication line system, particularly an ISDN or XDSL system, is performed with a tunable hybrid having tunable passive elements. The tunable hybrid is integrated in the analog front-end portion of the communication line system. The values of the tunable passive elements are digitally controlled by a microprocessor.

16 Claims, 2 Drawing Sheets

METHOD AND DEVICE FOR ECHO CANCELLING

BACKGROUND OF THE INVENTION

The invention concerns a method for echo cancelling in a communication line system, particularly an integrated services digital network, abbreviated with ISDN, or any digital subscriber line, abbreviated with XDSL, system. Echo cancelling is normally performed in the analog front end of the communication line system, more particularly in between the line transformer and the analog/digital and digital/analog converters. The analog front end is part of the interface between the two-wire line and the digital transmitting and receiving devices coupled to it. It is known to realise echo cancelling by means of digital filter techniques.

Another known method consists in the synthesis of a digital hybrid impedance at the digital side of the A/D converter.

U.S. Pat. No. 5,287,406 discloses such method. A digital balancing circuit for cancelling a return echo is operatively connected to the two-wire/four-wire conversion means.

These digital methods for echo cancelling can however not sufficiently remove inherent non-linear distortion originating within the analog front end itself in the RX and TX paths.

SUMMARY OF THE INVENTION

The invention seeks to provide a method permitting to avoid this drawback.

According to the invention, echo cancelling is performed by means of a hybrid which comprises tunable passive elements whereby the values of the tunable passive elements are adapted and controlled by digital control means.

The tuning is analog but the control is digital. As the adaptive echo cancelling is achieved before any digital processing, it improves, in contrast to digital echo cancelling, the signal-to-noise ratio of the received and transmitted signals, and remedies the aforementioned non-linear distortion problems from the analog front end. The term "comprise" has to be interpreted here as being non limitative.

Preferably a scaling factor is used for the tunable passive elements, for instance to permit an implementation on an integrated circuit.

The adaptation of the passive elements comprise the evaluation of the TX return loss gain in the hybrid, whereby the digital control means goes through a loop of adaptation of the tunable passive elements when this gain differs from zero, until this zero value of the gain is obtained.

The device according to the invention and particularly suitable to perform the above mentioned method comprises:

- a hybrid, integrated in the analog front end of the communication line system, said hybrid comprising tunable passive elements, the values of which are controllable, and
- digital control means coupled to the hybrid for controlling the tunable passive elements.

The passive elements may be mounted on-chip thereby enabling a cost effective implementation of this device.

The hybrid may comprise a hybrid bridge and a current to voltage converter.

The hybrid bridge may comprise two identical branches, each containing two impedances in series, one being a tunable balance impedance.

BRIEF DESCRIPTION OF THE DRAWINGS

The digital control means may comprise a microprocessor. The invention will now be described by way of example and with reference to the accompanying drawings in which.

DETAILED DESCRIPTION OF THE INVENTION

Figure 1:
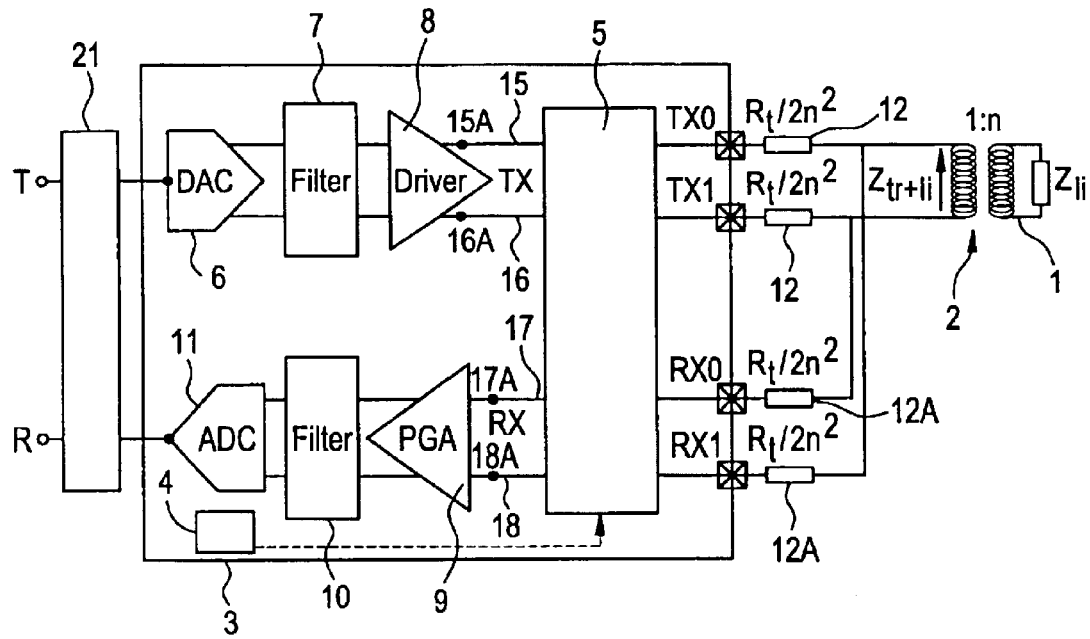
FIG. 1 shows a block diagram of the interface between the line and the terminals of a transmitting and receiving device in a communication line system.

FIG. 1 shows the interface between the two-wire line 1 with impedance $Z_{li}$ of an ISDN or XDSL network, on the one hand, and the terminals T and R of a digital transmitting and receiving device 21, for instance from a modem, on the other hand.

This interface comprises essentially a line transformer 2 with a transformer ratio 1:n, connected to the four connection pins TX0, TX1, RX0 and RX1 of the front end 3, which front end 3 is connected to the terminals T and R of this digital transmitting and receiving device 21.

In this front end 3 is integrated an echo canceller including a hybrid 5 and a digital control means 4, for instance a microprocessor.

In the transmitting or sending direction (TX direction), a digital/analog converter 6, a filter 7 and a driver 8 are mounted before the hybrid 5, while in the receiving or RX direction, this hybrid 5 is followed by a programmable gain amplifier 9 assuring a constant output power, a filter 10 and an analog to digital converter 11. In the TX direction, the pins TX0 and TX1 are coupled to the transformer 2 via line termination resistors 12. These are protection resistors limiting the power dissipation in the hybrid and analog front end, and having the resistance value $R_t/2n^2$, wherein n is the above mentioned ratio of the transformer 2.

A typical resistance value of $R_t$ is 50 Ohm.

The pins RX0 and RX1 are coupled to the transformer 2 via line termination resistors 12A having the same above mentioned resistance value.

Figure 2:
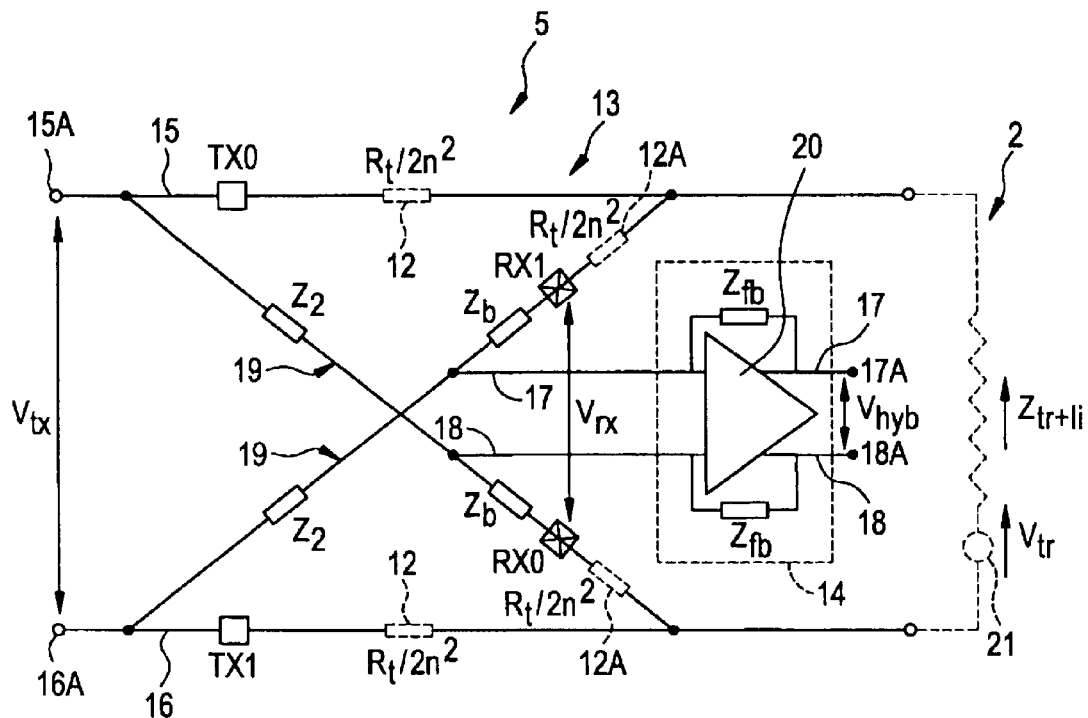
FIG. 2 shows schematically the echo canceller from the interface of FIG. 1.

As shown in FIG. 2, the hybrid 5, possibly implemented as an integrated circuit, is composed of a hybrid bridge 13 and a current to voltage converter 14.

The hybrid bridge 13 combines the TX paths 15 and 16 starting from the output terminals 15A and 16A of driver 8, and the RX paths 17 and 18 terminating at the input terminals 17A and 18A of the programmable gain amplifier 9, and connects these terminals 15A, 16A, 17A and 18A to connection pins TX0, TX1, RX1 and RX0 respectively.

This hybrid bridge 13 contains two identical branches 19 coupling terminals 15A and 16A at the output side of the driver 8 with the connection pins RX0 and RX1, each branch 19 containing two impedances in series: balance impedance $Z_b$ and impedance $Z_2$.

The impedance $Z_2$ in one of the branches 19 is mounted between terminal 15A and the balance impedance $Z_b$ in series, another terminal of this balance impedance being coupled to connection pin RX0.

The impedance $Z_2$ in the other branch 19 is mounted between terminal 16A and the balance impedance $Z_b$ in series with it, another terminal of this balance impedance being coupled to connection pin RX1.

Impedances $Z_2$ and impedances $Z_b$ comprise tunable passive elements such as resistors, capacitors or inductors, controllable by the microprocessor 4. How these elements are tuned will be discussed in a further paragraph.

Moreover, a scaling factor k is used for the values of the passive elements of the impedances $Z_2$ and $Z_b$ in such a way that these impedances can then for instance be implemented on-chip. Values for this scaling factor are for example 100 or 1000.

Figure 3:
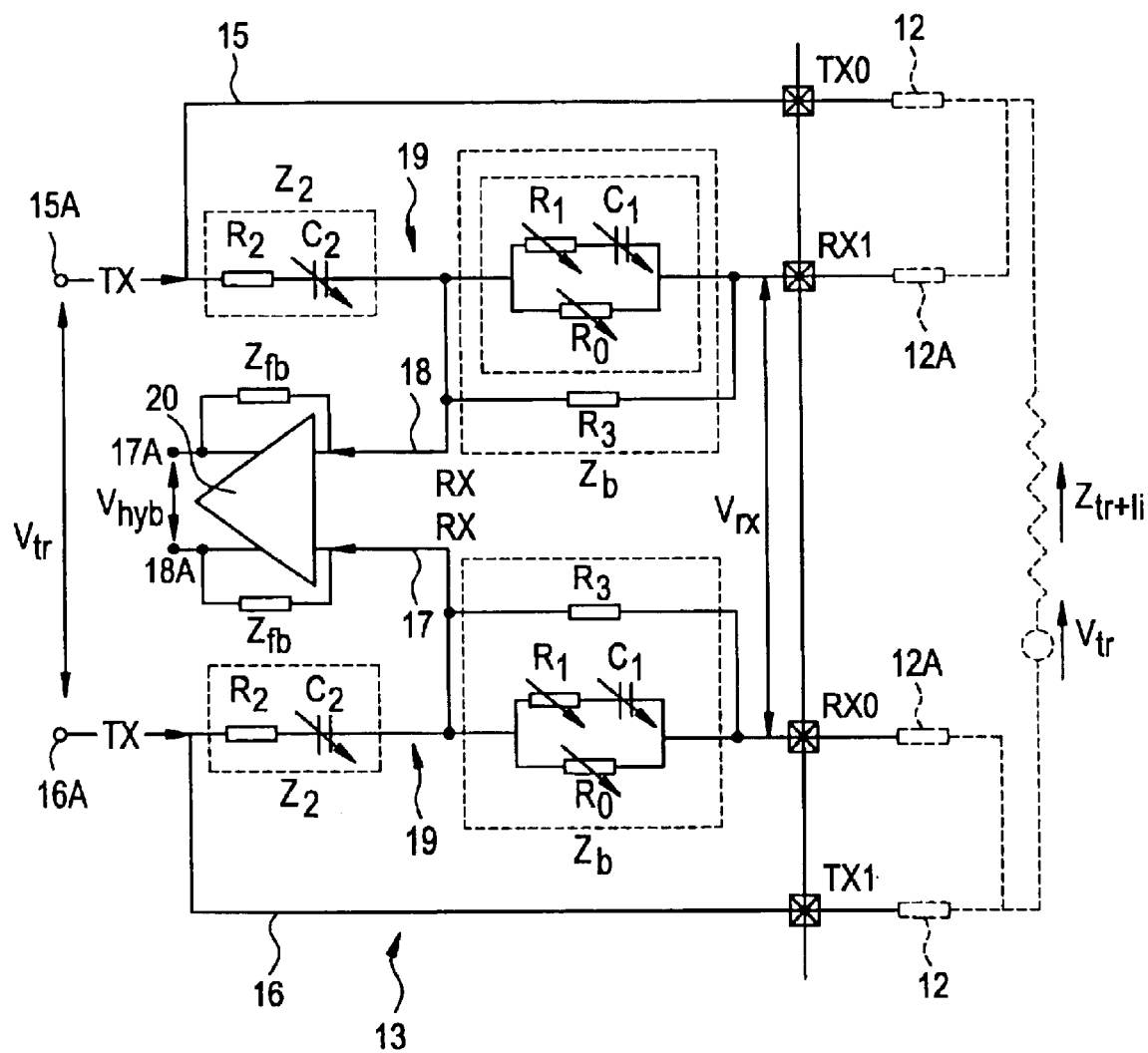
FIG. 3 shows more in detail the architecture of the echo canceller of FIG. 2.

As shown in detail in FIG. 3, each balance impedance $Z_b$ comprises a tunable resistor $R_0$, and, in parallel with this, a series connection of a tunable resistor $R_1$ and a tunable capacitor $C_1$, and in parallel with this circuit another not necessarily tunable resistor $R_3$ which may be scaled to value $2\ kR_t/2n^2$, wherein k is said scaling factor. The value $2\ kR_t/2n^2$ corresponds to the value of the line termination resistors 12 and 12A discussed previously.

In one embodiment the tunable resistors $R_0$ and $R_1$ and the tunable capacitor $C_1$ consist of a number of small discrete resistors in series, resp. capacitors in parallel. Tuning takes place by the control register of the microprocessor 4 connecting or disconnecting small resistors or capacitors so permitting a discrete controlling of the resistance or capacitance value.

The other impedance $Z_2$ in each branch consists of a not necessarily tunable resistor $R_2$ having the same resistance value as the resistor $R_3$, which may thus also be scaled to value $2\ kR_t/2n^2$, in series with a tunable capacitor $C_2$. This capacitor compensates for the inductance of the transformer 2.

In one embodiment the tunable capacitor $C_2$ consists of a number of small discrete capacitors in parallel and the control register of the microprocessor 4 connects or disconnects small capacitors so permitting a discrete controlling or tuning of the capacitance.

The current to voltage converter 14 consists of an operational amplifier 20 and two tunable feedback impedances $Z_{fb}$, which have each the same configuration as impedances $Z_b$ and thus the same passive elements.

In order to have a hybrid gain independent from the setting or frequencies, the feedback impedances $Z_{fb}$ of the current to voltage converter 14 are also tuned to be equal to $Z_b$ because in that case the current to voltage converter 14 acts as a differential amplifier with gain one.

The gain $G_{rx}$, being the gain from the voltage $V_{rx}$ between the pin connections RX0 and RX1, to the voltage $V_{hyb}$ at the output of the current to voltage converter 14 can be written as:

$G_{rx}=V_{hyb}/V_{rx}$, which is equivalent to:

$G_{rx}=-Z_{fb}/Z_b$ which is one if $Z_{fb}=Z_b$.

The hybrid bridge 13 works in both directions, transmission and reception.

In the transmission or TX direction, the hybrid bridge 13 receives a voltage signal $V_{tx}$ from the TX driver 8 between terminals 15A and 16A of paths 15 and 16, and transmits it directly to the pins TX0 and TX1.

In the reception or RX direction, a voltage signal coming from line 1 is firstly transformed by the transformer 2 into a voltage between connection pins RX0 and RX1 as shown in FIG. 1.

The resulting current through impedance $Z_b$ is converted to voltage $V_{hyb}$ in the current to voltage converter 14.

The programmable gain amplifier (PGA) 9, is such that it compensates for the gain in the previous path, leading to a total gain $G_{trx}$, this is the gain from $V_{tr}$ to $V_{hyb}$, being reduced to one. $V_{tr}$ is the voltage over the equivalent line voltage source 21 in series with the equivalent impedance $Z_{tr+li}$ of the line 1 and the transformer 2 in the equivalent circuit as indicated in dashed line in FIGS. 2 and 3 and $V_{hyb}$ is the voltage at the output of the current to voltage converter 14.

The man skilled in the art knows that this total gain $G_{trx}$ can be deduced as follows:

$G_{trx}=V_{hyb}/V_{trx}$, this is:

$G_{trx}=Z_{fb}*(R_t/2n^2)/[Z_b(R_t/2n^2)+R_t/2n^2+Z_b)*Z_{tr+li}/2]$ $G_{trx}=Z_{fb}/Z_b*(R_t/2n^2)/(R_t/2n^2+Z_{tr+li}/2)$ This gain $G_{trx}$ is not influenced by the echo cancelling.

Because the hybrid bridge 13 is in fact a differential impedance bridge, it is known for the man skilled in the art that the best echo return loss is obtained when the bridge is in equilibrium.

When the bridge is in equilibrium, the TX return loss gain, denoted hereafter as $G_{txrl}$, is equal to zero.

Consequently, during initialisation of the system this TX return loss gain is evaluated as will be described hereafter.

A person skilled in the art can easily deduce that the evaluation of the TX return loss gain $G_{txrl}$, this is the gain from $V_{tx}$ to $V_{hyb}$, wherein $V_{tx}$ is the known voltage applied to terminals 15A and 16A, can be obtained as follows:

TX return loss gain:

$G_{txrl}=V_{hyb}/V_{tx}$ $G_{txrl}=Z_{fb}/Z_2*[Z_2-Z_b-(R_t/2n*(Z_{tr+li}+2Z_b)/Z_{tr+li}]$ divided by $[Z_2*((R_t/2n*(Z_{tr+li}+2Z_b)/Z_{tr+li}+Z_b)]$ The TX return loss gain $G_{txrl}$ is equal to zero when the following condition is fulfilled:

$Z_b$ must be equal to:

$kZ_{tr+li}*(Z_2-R_t/2n^2)/(kZ_{tr+li}+2kR_t/2n^2)$ where k is the scaling factor.

If k is chosen such that $Z_2-R_t/2n^2=k\ 2R_t/2n^2$ being equivalent to:

$Z_2=(2k+1)R_t/2n^2$, and $Z_b$ reduces to: $Z_b=[1/kZ_{tr+li}+1/k(2R_t/2n^2)]^{-1}$ The balance impedance $Z_b$ should thus approximate as close as possible the combination of the scaled termination resistance value $2kR_t/2n^2$ in parallel with the scaled line and transformer impedance value $kZ_{tr+li}$. The hybrid bridge is then in equilibrium and, as already mentioned, gives the best echo return loss.

In practice, the hybrid TX return loss gain $G_{txrl}$ is calculated by the microprocessor 4 from the digitalised value of the measured voltage $V_{hyb}$ and the digitalised known value of $V_{tx}$.

If the hybrid TX return loss gain $G_{txrl}$ differs from zero, the microprocessor tunes the tunable passive elements in the hybrid 5 and goes through a loop of adaptation until the zero value is obtained. After the adaptation is finished, the tunable passive elements $R_1$, $C_1$ and $C_2$ have reached their optimal value.

For this adaptation loop a dedicated fitting algorithm is used, for example the known "steepest descent" algorithm. With this steepest descent algorithm, the microprocessor 4 changes successively the value of the different tunable passive elements with a positive and a negative increment, the influence of thereof on the voltage $V_{hyb}$, is checked and the element is finally changed in the sense resulting in a decrease of $V_{hyb}/V_{tx}$. This is repeated until the voltage ratio $V_{hyb}/V_{tx}$, this is the TX return loss gain $G_{txrl}$, no longer decreases.

In one embodiment, particularly for xDSL applications, the resistor $R_0$ can be tuned between values of 28 and 896 kOhm, the resistor $R_1$ between values of 15 and 240 kOhm, the capacitor $C_1$ between values of 7.5 and 120 pF and the capacitor $C_2$ between values of 240 and 390 pF.

What is claimed is:

1. A method for echo cancelling in a communication line system, the method comprising:

measuring an output transmission voltage and an input transmission voltage of a hybrid to determine a transmission return loss gain in said hybrid, wherein said hybrid comprises a bridge with two branches, each branch comprising at least one tunable balance element; and tuning said tunable balance elements to be substantially equal to a scaled impedance value of a parallel circuit comprising the line termination resistance in transmission paths of the hybrid bridge and the line impedance, wherein said tunable balance elements are controlled by digital control means to reduce the transmission return loss gain.

2. The method according to claim 1, wherein a scaling factor is used for adjusting said tunable balance elements.

3. The method according to claim 1, wherein when the transmission return loss gain differs from zero, the digital control means adjusts said tunable balance elements until a zero value of said transmission return loss gain is obtained.

4. The method according to claim 1, wherein said hybrid comprises a current to voltage converter, the feedback impedances of which being adjusted so as to be equal to said tunable balance elements.

5. A device for echo cancelling in a communication line system, comprising:

a hybrid comprising a bridge with two branches, each branch comprising a tunable balance element, wherein said balance elements are tuned to be substantially equal to a scaled impedance value of a parallel circuit comprising the line termination resistance in transmission paths of the hybrid bridge and the line impedance; and digital control means coupled to said hybrid, said digital control means controlling the values of said tunable balance elements to reduce a transmission return loss gain in said hybrid.

6. The device according to claim 5, wherein said tunable balance elements of said hybrid are scalable by a predetermined scaling factor.

7. The device according to claim 5, wherein said hybrid comprises a current to voltage converter.

8. The device according to claim 7, wherein each branch of said hybrid bridge further comprises tunable impedance in series with said tunable balance element.

9. The device according to claim 5, wherein said tunable balance element comprises a first tunable resistor, in parallel with a series connection of a second tunable resistor and a tunable capacitor, and in parallel with a fixed value resistor.

10. The device according to claim 9, wherein said fixed value resistor has the same resistance value, as the line termination resistors in the transmission paths of the hybrid bridge, scaled with a scaling factor.

11. The device according to claim 8, wherein said tunable impedance in each branch comprises a resistor in series with a tunable capacitor, the value of said resistor being the same as the resistance value of said line termination resistors in the transmission paths of the hybrid bridge, scaled with a scaling factor.

12. The device according to claim 7, wherein said current to voltage converter comprises an operational amplifier with tunable feedback impedances having the same impedance values as said tunable balance element.

13. The device according to claim 5, wherein said digital control means comprises a microprocessor.

14. The device according to claim 8, wherein said tunable balance elements are part of an integrated circuit.

15. The method according to claim 1, wherein said transmission return loss gain is based upon an output transmission voltage from said hybrid and an input transmission voltage to said hybrid.

16. The device according to claim 5, wherein said transmission return loss gain is based upon an output transmission voltage from said hybrid and an input transmission voltage to said hybrid.

* * * * *